Mar. 20, 1923.

F. A. MARSH

WATER GAUGE AND TEMPERATURE INDICATOR

Filed June 20, 1922    2 sheets-sheet 1

Inventor
Fred A. Marsh
Eccleston & Eccleston
Attorneys

Mar. 20, 1923.

F. A. MARSH

WATER GAUGE AND TEMPERATURE INDICATOR

Filed June 20, 1922     2 sheets-sheet 2

1,449,124

Inventor
Fred A. Marsh
Eccleston & Eccleston
Attorneys

Patented Mar. 20, 1923.

1,449,124

UNITED STATES PATENT OFFICE.

FREDERICK A. MARSH, OF COLUMBUS, OHIO.

WATER GAUGE AND TEMPERATURE INDICATOR.

Application filed June 20, 1922. Serial No. 569,728.

*To all whom it may concern:*

Be it known that I, FREDERICK A. MARSH, a citizen of the United States, residing at Columbus, in the county of Franklin and State of Ohio, have invented a new and useful Water Gauge and Temperature Indicator, of which the following is a full, clear, and exact description.

My invention relates to a combined water gauge and temperature indicator for the water used in cooling internal combustion engines, and has for its object to provide such a device in which the thermometer will be in direct contact with the water or other cooling liquid, thereby giving the actual temperature of the liquid rather than the temperature of the surrounding air.

Another object of the invention resides in the construction of a device whereby a portion of the cooling liquid will be exposed to view so long as there is a sufficient amount thereof in the radiator and connected parts.

Other objects and advantages of the invention will be apparent from the following description when taken in connection with the accompanying drawing, in which.

Figure 1:
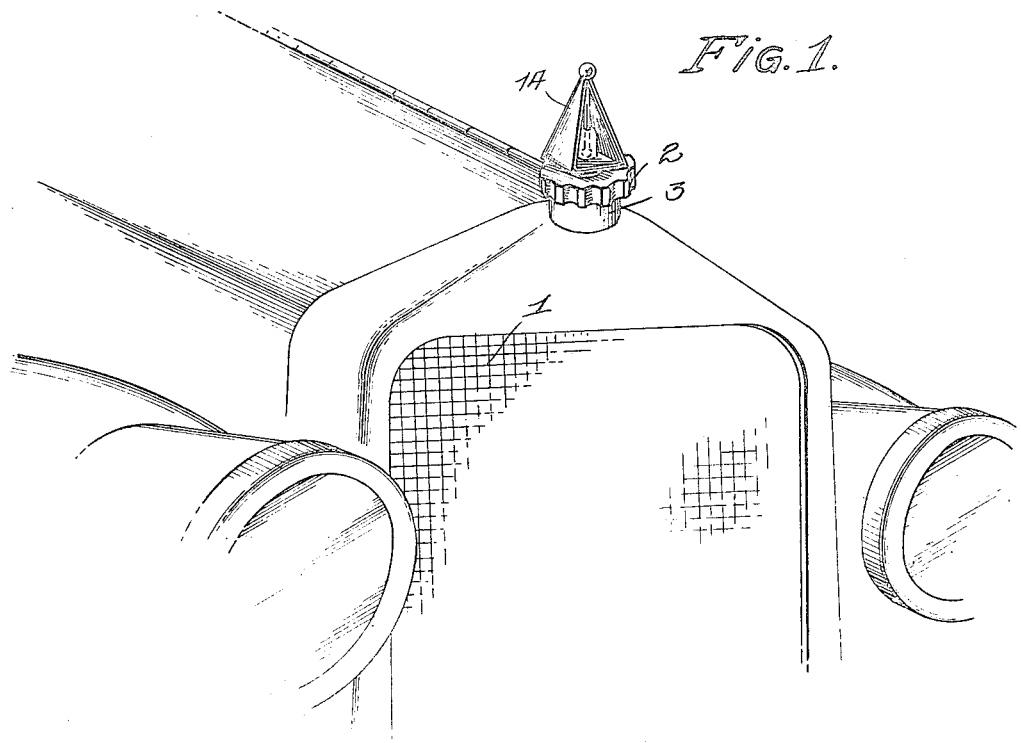
Figure 1 is a fragmentary perspective view of an automobile with my combined gauge and temperature indicator attached thereto.
Figure 2:
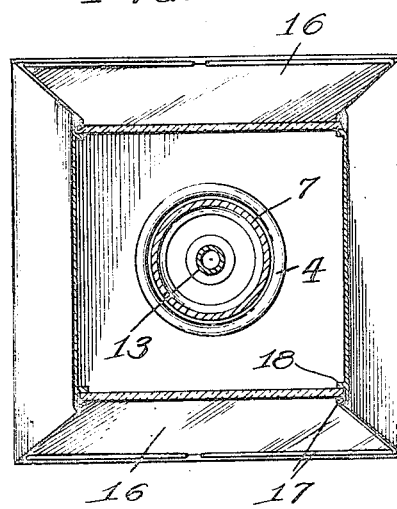
Figure 2 is a horizontal section taken through the device on line 2—2, Figure 5.
Figure 3:
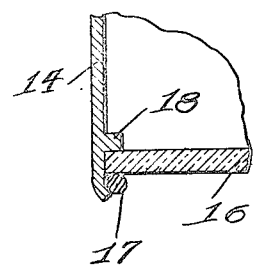
Figure 3 is a detail section, showing means for locking the front and rear plates in position.

Referring to the drawing more in detail, the numeral 1 designates the radiator of an automobile, having the usual cap 2 for closing the neck 3. Extending through the top of the cap 2 is the sleeve 4 having a shoulder 5 adjacent its upper end and threaded for the reception of a nut 6 for clamping the parts together.

The sleeve 4 is lined with cork or other cushioning material and has connected therewith the inverted tube 7 made of glass or similar transparent material. The tube 7 extends above and below the sleeve 4 and the latter has a metallic guard tube 8 threaded to the lower end thereof. The tube 7 may be narrowed slightly at its lower end and surrounded by a washer 9 of cork or the like, which is inserted between the tubes 7 and 8. The parts are held in this position by means of fingers 10 bent in from the edge of the guard tube 8.

It is desirable, although not absolutely necessary, to employ a closure in connection with the tube 7 and I have, therefore, provided the tube 8 with the downwardly extending arms 11. Slidably mounted on the arms 11 is a disc 12 provided with slotted lugs 13 which receive the arms 11. The disc 12 when in closing position seats on the gasket or washer 9 which forms an air-tight seal.

Extending through the upper end of the tube 7 is a thermometer 21 which is welded or otherwise connected to the tube in an airtight manner. The thermometer 21 and the upper portion of the water gauge tube 7 may be inclosed in a casing 14 of suitable shape, such, for instance, as a pyramidal design, which is secured to the upper end of the sleeve 4, as indicated at 15. The front and rear walls of the casing are formed of panels of transparent material 16, such as glass, which are held in place by resilient wire clips 17 which hold the panels against the shoulders 18 of the casing. A block of cork or other resilient material 19 is positioned in the apex of the casing 14 and acts as a cushion and brace for the upper end of the thermometer 21.

One or both of the transparent walls of the casing 14 will be provided with suitable indicia, in order that the condition of the motor, as regards temperature, may be obtained at a glance.

It is desirous that the maximum amount of cooling liquid remain in the radiator as long as possible, and to this end I have provided an anti-splash device 20 which comprises a ring connected to the guard tube 8. The ring 20 aids in preventing the water in the radiator from being splashed into the usual overflow pipe.

Figure 4:
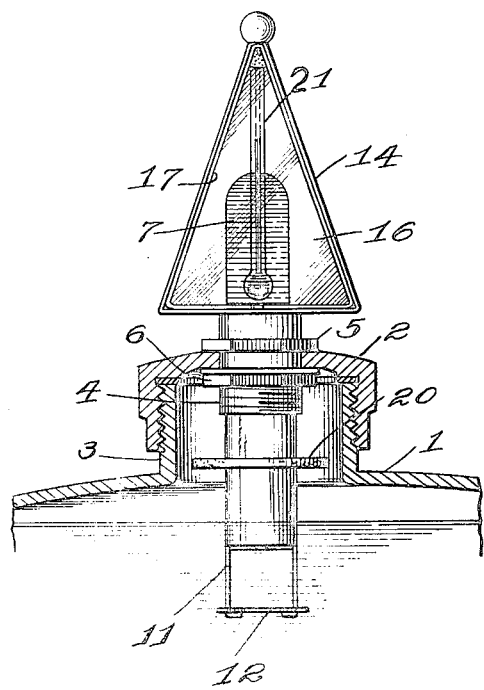
Figure 4 is a vertical section through a portion of an automobile, showing the indicator in front elevation.
Figure 5:
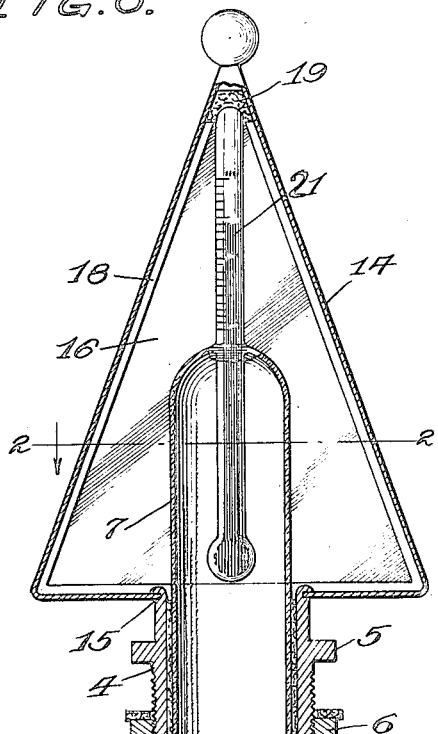
Figure 5 is a vertical section through the combined water gauge and temperature indicator.
Figure 6:
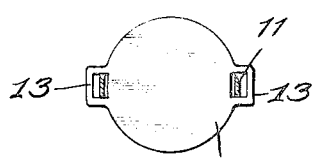
Figure 6 is a horizontal section taken on line 6—6 of Figure 5.
Figure 7:
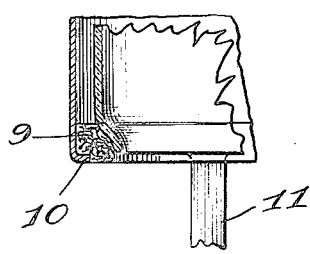
Figure 7 is a vertical section taken on line 7—7 of Figure 5.
Figure 7:
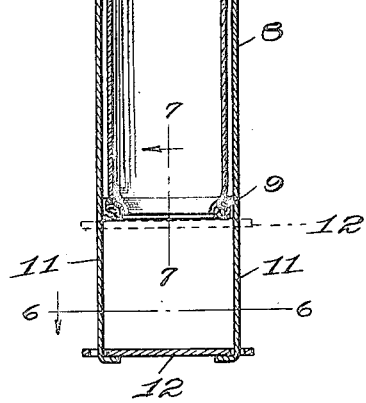

In operation, the cap 2, which is removed for the purpose of filling the radiator, is inverted and the tube 7 filled; the closure disc 12 is then lowered to its position in contact with the seat 9, as shown in dotted lines in Figure 5. The disc is held against its seat until the cap is returned to normal position, when the same may be released, but will maintain its position on the gasket 9, due to atmospheric pressure. The cap 2 may now be screwed onto the neck 3 of the radiator, and when the tube 7 comes into contact with the water in the radiator the disc 12 will be released and will fall to the position shown by full lines in Figures 4 and 5. It will be understood that the column of water in the tube 7 will be held therein by atmospheric pressure so long as the mouth of the tube remains below the surface of the water in the radiator. When the amount of water is reduced by vaporization, etc., to such an extent that the tube 7 becomes uncovered, the water in the tube will escape and thus indicate to the operator that the radiator needs refilling. It should be here noted that the thermometer 21 has its bulb in direct contact with water in the radiator and is responsive to the exact temperature thereof, and, therefore, necessarily gives accurate indications of the condition of the motor.

In place of the disc 12, the finger may be employed to cover the open end of the tube 7, but it is preferred to use the disc.

In some automobile constructions the overflow pipe may interfere with the use of the rigid guard tube 8, and in such cases a flexible tubing would be substituted therefor.

It will also be understood that other means may be provided for creating the water column in the tube. For example, instead of inverting the tube and filling it with water or other liquid, it would be possible to employ a bulb or equivalent means to cause a partial vacuum in the tube, and thus permit the water to rise therein.

In accordance with the patent statutes, I have described what I now believe to be the best embodiment of the invention, but I do not wish to be understood thereby as limiting myself or the scope of the invention, as many changes and modifications may be made without departing from the spirit of the invention; all such I aim to include in the scope of the appended claims.

What I claim as new and desire to secure by Letters Patent is:

1. The combination with an automobile radiator cap, of a glass tube extending through said cap, said tube being closed at its upper end and open at its lower end, and means of greater specific gravity than water for temporarily closing the lower end of the tube.

2. The combination with an automobile radiator cap, of a glass tube extending through said cap, said tube being open at its lower end, rods extending beyond the open end of said tube, and a closure slidably mounted on said rods.

3. The combination with an automobile radiator cap, of a glass tube extending through said cap, said tube being open at its lower end, and a disc closure slidably mounted with respect to said open end.

4. The combination with a radiator cap, of transparent means extending therethrough for holding a column of water above the normal level of the water in the radiator, and a thermometer in said means.

5. A device of the class described, including a casing, a thermometer positioned in the upper portion of the casing, a tube in said casing receiving a portion of said thermometer, said tube being open at its lower end and closed at its upper end, and a closure for the lower end of said tube.

6. A tube of transparent material adapted to be connected to a radiator cap, said tube being open at its lower end, and a closure of greater specific gravity than water for the open end of said tube.

7. An indicator, including a tube of transparent material adapted to be connected to a radiator cap, said tube being open at its lower end, and a thermometer extending through the upper end of said tube.

8. The combination with a radiator cap, of an inverted tube for holding a column of water above the normal level of the water in the radiator, a casing enclosing the upper portion of said tube, a thermometer extending through the upper end of said tube, and means interposed between the upper end of the thermometer and the casing for bracing the former.

9. The combination with a radiator cap, of an inverted tube for holding a column of water above the normal level of the water in the radiator, a protective casing encircling the lower portion of the tube, a closure for said tube, and means extending below said casing for slidably mounting the closure with respect to the tube.

FRED. A. MARSH.